Figures 1, 2:
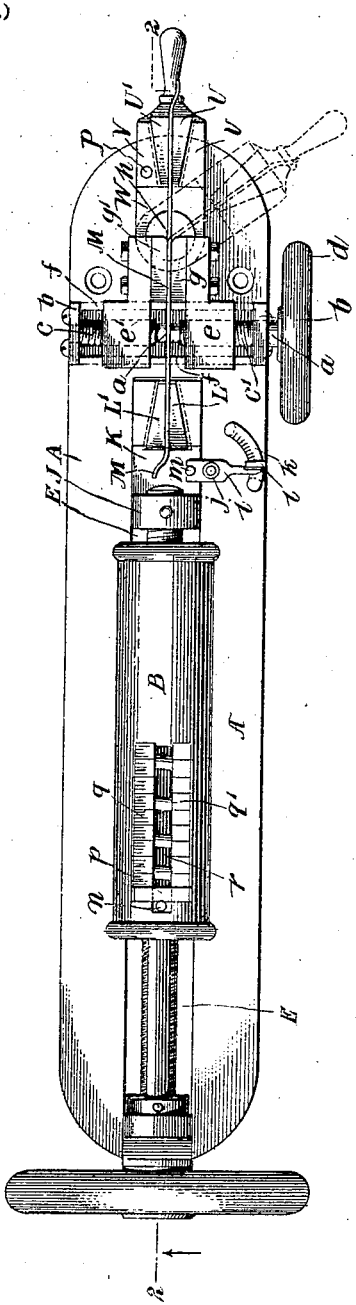

No. 673,526. Patented May 7, 1901.
L. C. MOORE.
TESTING APPARATUS.
(Application filed Sept. 15, 1900.)
(No Model.) 2 Sheets—Sheet 1.

WITNESSES:
Geo. W. Naylor
Edgar A. Mead.

INVENTOR
Lee C. Moore
BY Phillips Abbott
ATTORNEY

THE NORRIS PETERS CO., PHOTO-LITHO., WASHINGTON, D. C.

No. 673,526. Patented May 7, 1901.
L. C. MOORE.
TESTING APPARATUS.
(Application filed Sept. 15, 1900.)
(No Model.) 2 Sheets—Sheet 2.

WITNESSES:
Geo. W. Naylor
Edgar A. Mead.

INVENTOR
Lee C. Moore
BY Phillips Abbott
his ATTORNEY

UNITED STATES PATENT OFFICE.

LEE C. MOORE, OF BROOKLYN, NEW YORK.

TESTING APPARATUS.

SPECIFICATION forming part of Letters Patent No. 673,526, dated May 7, 1901.

Application filed September 15, 1900. Serial No. 30,123. (No model.)

*To all whom it may concern:*

Be it known that I, LEE C. MOORE, a citizen of the United States, and a resident of Brooklyn, in the county of Kings and State of New York, (having my post-office address at No. 1339 Bedford avenue,) have invented a new Testing Apparatus, of which the following is a description, reference being had to the accompanying drawings.

In the manufacture of wire or strip metal, particularly if the same is to be used in wire rope, cable, or other structure in which it will be subjected to bending as well as tensile strains, it is desirable to know the strength of the metal—in other words, its ability to resist fracture when subjected to both of the strains mentioned—and it has been customary to subject the metal to these two tests as separate operations and upon separate apparatus. As a result of many years experience in this art and various experiments relating to the subject, I have found that the tests as heretofore made are an unsafe guide in many instances, because owing to certain physical features present in the metal, but not fully understood, it will make one showing when subjected to the tests as separate operations and a totally different one when subjected to them contemporaneously—that is to say, the same piece of wire may show a tensile strength of four hundred pounds and a bending strength of perhaps thirty when these tests are made separately, yet the same wire when under strain to an amount, say, of three hundred pounds if then flexed will show bending resistance of perhaps fifteen or twenty only. Also this same wire after having been flexed if again subjected to tensile strain may show a fracture-point much lower than it originally indicated—*i. e.*, four hundred pounds.

The object of my invention, therefore, is to afford an apparatus by which the metal can be subjected to the said strains contemporaneously—that is to say, the test may be applied for tensile strength and while under strain the bending test may be applied, and then, if desired, after the bending test the test for tensile strength may be again applied. In other words, in my apparatus the metal is subjected to tests which coincide with the conditions of its use. My apparatus is also so constructed that it will register the extent of the stretch of the metal when subjected to said strains.

Figure 3:
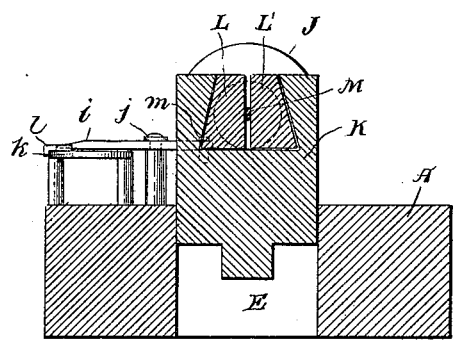
Figure 4:
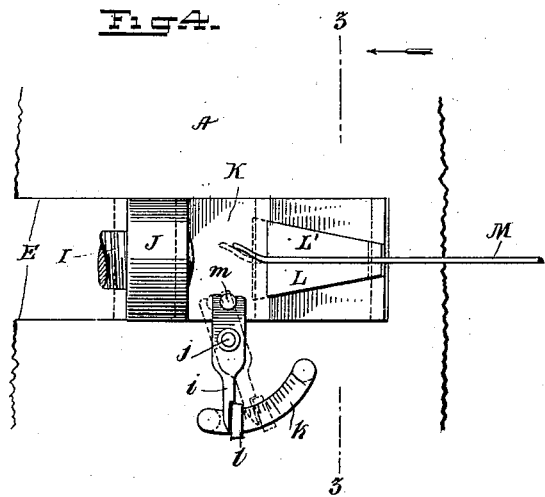

Referring to the drawings hereof, Figure 1 illustrates a plan view of the apparatus. Fig. 2 illustrates a vertical sectional view. Fig. 3 illustrates a vertical cross-section taken through the central part of the jaws L L'. Fig. 4 illustrates a detail of the stretch-indicating apparatus.

A is the base-plate. It may be provided with legs for its support, or clamping devices may be employed whereby it may be attached to any suitable support. These parts are not shown.

B is a casing which incloses a spring C, and it is provided with two downwardly-extending lugs D D, which operate through a slot E, made in the base. The spring C abuts at one end against the end of the casing B, as seen at F, and at the other end against the head G of a bolt or rod H, which at its forward end I is threaded into a stud J of a jaw-carrying block K. This block slides in the slot E in the base-plate, and it carries two jaws L and L', which are tapering in outline, as shown best in Fig. 1, and preferably undercut or dovetailed somewhat, as shown by the dotted lines, to secure rigidity when in position. Their meeting faces are provided with file-tooth finish, so as to give firm hold upon the wire M or other metal to be tested.

N is a threaded spindle shouldered at O against a stud P, which is supported upon the base, and at the end of the spindle there is a hand-wheel or other equivalent device Q, whereby the spindle N may be turned. It is threaded into corresponding threads in the two lugs D D of the casing B.

R is a bolt or spindle preferably headed at its ends, as at S S'. It slides loosely through a hole made in the head T of the casing B. Its purpose will be explained later.

Opposite the jaws L L' are other jaws U U', which are or may be similar in construction to the jaws L L'. They are supported in a block V on a lever W, which is pivoted by a heavy bolt *y* to an extension *z*, projecting from this end of the base.

*a* is a cross-shaft supported in bearings *b b'* on the base-plate and threaded right and left, as shown at *c c'*, and provided with a hand-wheel $d\,d$ or equivalent device whereby it may be turned.

$e\,e'$ are two siding blocks which move in a slideway $f$, made transversely of the apparatus, and at their ends carry two jaws $g\,g'$, which are clamped to extended portions of the sliding blocks $e$ and $e'$ by bolts, as shown. The forward faces of these jaws $g$ and $g'$ are rounded, as shown at $h$, on the arc of a circle which is preferably about four times the diameter of the wire or metal to be tested. It is sometimes desirable to have the arc larger.

$i$ is a device to register the amount of stretch of the metal. It is a lever pivoted at $j$, and $k$ is a scale. The end of the lever presses forwardly along the scale an indicator $l$, which is not attached to the lever, so that should the metal break and the parts rebound the indicator will remain stationary upon the scale as a permanent record of the amount of the stretch. The rear end of the lever $i$ is connected to the block K by a pin $m$, whereby the lever receives the movement of the block K, and the engagement between the lever and the pin is made quite snug, so that there is not any lost motion.

$n$ is a pin set in the head G of the rod or spindle H, which presses forward an indicator $p$, which registers with scale $q\,q'$ on the exterior of the casing B. The indicator $p$ is not connected to the pin $n$, but is simply pressed forward by it, so that upon the rebound of the parts there will be no movement of the indicator, and it will remain as a permanent record of the tensile strength of the metal, in conjunction with the indexes $q$ and $q'$. The pin $n$ moves through a slot $r$, made in the upper side of the casing B.

The operation is as follows: The hand-wheel Q is first turned in such manner as to move the jaws L and L', the casing B, and coacting parts as far as possible to the right, and the indicators $l$ and $p$ are moved backwardly as far as they will go to the ends of the scales, respectively. The hand-wheel $d$ is then turned, so as to open the jaws $g$ and $g'$ sufficiently to permit the insertion of the metal between them. The jaws L L' and U U' are then loosened and a section of the wire or other metal inserted between them, respectively, and they are then set up against the metal in the usual manner. Thereupon the hand-wheel Q is turned to retract the casing B toward the left. In so doing the spring C, which of course is exactly graduated as usual in such apparatus, is put more and more under strain, whereby the block K, carrying the jaws L and L', is in turn pulled to the left with greater and greater force as the spring is compressed, and the pin $n$, engaging with the indicator $p$, causes it to slide over the face of the scale $q\,q'$, as the casing B moves to the left. Likewise the stretch-indicator $i$ by reason of the engagement of the pin $n$ with it is rocked upon its pivot $j$, and it carries the indicator $l$ around upon the scale $k$. When the metal has been subjected to the desired tensile strain in the manner just explained, then in order to subject it to bending strains while under tension the hand-wheel $d$ is turned in such manner as to bring the jaws $g\,g'$ forcibly against the metal being tested and between the jaws U U' and L L', and when the jaws $g\,g'$ have firmly clamped it the lever W is swung to the right and left, as indicated in dotted lines in Fig. 1. In so doing it swings upon the center $y$, which, as above stated, is a strong bolt having large bearing upon the lever W and is provided with a head, as shown in Fig. 2, so that this swinging to right and left is a strong smooth movement, and the metal being tested is bent alternately in one direction and then in the other over the rounded edges $h$ of the jaws $g$ and $g'$. It will thus be seen that the metal is subjected to bending strain at the time it is under tensile strain. In other words, it is subjected to the same strains to which it will be incident in actual use. After the bending test has been successfully accomplished the lever W may be swung into its original position (shown in Fig. 1) and the jaws $g\,g'$ again relaxed and the effect of the tests observed by the stretch-indicator $i$. If desired, further tensile test may then be applied to see the effect of the bending upon the metal.

Those who are familiar with this art will at once perceive that by this apparatus a series of pieces of the wire or equivalent material may be subjected to a series of tests, and a comparison of these tests will give most accurate information as to the quality or characteristics of the metal—that is to say, one piece may be subjected to the tensile test only, another piece to the bending test only, another to tensile and bending test while under tension, and another to a tensile test and a bending test and subsequently to a second tensile test, and a comparison of the data obtained will give most accurate and satisfactory information, whereby the manufacturer of wire rope, cable, or similar goods may with much greater certainty than heretofore give assurances to his customers. In this matter not only will more satisfactory results be acquired, but also frequent loss of life avoided.

The purpose of the spindle R is to prevent injurious shock to the machine consequent upon the breaking of the metal when under tensile strain. It will be observed that the left-hand end of this spindle R abuts against the fixed lug P, and, as stated, it slides loosely through the end T of the casing B, and its forward end, shown by the head S, is within a very short distance of the rear end of the head G upon the spindle H. These parts maintain their relative position at all times and irrespective of the position of the other parts, except that the spindle H approaches the spindle R to the extent of the stretch of the metal being tested. Allowance must be made for this. Consequently in the event of fracture of the metal the spring C can throw the spindle H to the left only so far as suffices to close the space between the adjoining ends of the two spindles H and R, and this may be made, if necessary, a small fraction of an inch, so that no injury will result to any part of the apparatus. It will remain in its then condition until the spring is let down by the proper turning of the handwheel Q.

I wish it to be understood that the construction shown in the accompanying drawings and described above is one form only, and a simple one at that, in which my apparatus may be constructed, and I do not limit myself to the details shown and described, because it will be obvious to those who are familiar with this art that very extensive modifications may be made in the form and arrangement of the parts without departing from the essentials of the invention, and certain parts may be beneficially supplied which have not been described or illustrated by me. The legs or supporting means have already been referred to. Also any suitable means for locking the lever W in line with the rest of the apparatus when desired to apply tensile test may be employed—such, for example, as a pin $p$ passing through the lever W and entering a suitable hole in the base.

Having described my invention, I claim—

1. In a metal-testing machine the combination of devices for applying tensile strain to the metal and for repeatedly bending the same in reverse directions while under tensile strain, of devices for registering the extent of the stretch of the metal as strained and bent, for the purposes set forth.

2. In a metal-testing machine the combination with devices for applying tensile strain to the metal and for repeatedly bending it in reverse directions, of devices adapted to grip the metal between its ends when strained, for the purposes set forth.

3. In a metal-testing machine the combination of two devices adapted respectively to grip the metal at or near its ends, one of said devices being pivoted whereby one end only of the metal may be bent laterally while under strain; and means to separate said devices and strain the metal, for the purposes set forth.

4. In a metal-testing machine the combination of devices for gripping the metal at or near its ends, means to separate said devices, means whereby the devices at one end may be laterally reciprocated, and means to grip the metal between its ends, for the purposes set forth.

5. In a metal-testing machine the combination of devices adapted to grip the metal between its ends while under tension, and other devices to repeatedly bend one of its ends in opposite directions, and means to register the stretch of the metal, for the purposes set forth.

6. In a metal-testing machine the combination of a spring-actuated pulling device and an immovable abutment therefor, whereby the power of the spring when released by the fracture of the metal will be controlled, for the purposes set forth.

7. In a metal-testing machine the combination of a pair of devices adapted to apply tensile strain to the metal, one of said devices being capable of lateral reciprocation while the metal is under strain, means to determine the extent of the strain, and means to lock the said laterally-reciprocating devices against said movement, for the purposes set forth.

8. In a metal-testing machine the combination of a pair of devices adapted to apply tensile strain to the metal, one of said devices being capable of lateral reciprocation while the metal is under strain, means to determine the extent of the strain, and means to indicate the stretch of the metal, if any, after being bent, for the purposes set forth.

9. In a metal-testing machine the combination of two pairs of oppositely-located jaws adapted respectively to grip one end of the metal being tested, one of said pairs of jaws being longitudinally movable away from the other, and the other pair being pivotally supported at a point between the two pairs, for the purposes set forth.

10. In a metal-testing machine the combination of two pairs of jaws adapted respectively to grip the end of the metal being tested, one of the pairs of jaws being movable longitudinally away from the other pair, and the latter pair being pivotally supported at a point lying between the said pairs of jaws, and an additional pair of clamping-jaws adapted to clamp the metal when stretched between the said stretching-jaws, for the purposes set forth.

11. In a metal-testing machine the combination of two pairs of jaws adapted respectively to grip the end of the metal being tested, one of the pairs of jaws being movable longitudinally away from the other pair, and the latter pair being pivotally supported at a point lying between the said pairs of jaws, an additional pair of clamping-jaws adapted to clamp the metal when stretched between the said stretching-jaws, and means to register the degree of strain applied to the metal by the stretching-jaws, for the purposes set forth.

Signed at New York, in the county of New York and State of New York, this 13th day of September, 1900.

LEE C. MOORE.

Witnesses:
 PHILLIPS ABBOTT,
 EDGAR R. MEAD.